United States Patent [19]

Cromack

[11] Patent Number: 4,726,662
[45] Date of Patent: Feb. 23, 1988

[54] DISPLAY INCLUDING A PRISMATIC LENS SYSTEM OR A PRISMATIC REFLECTIVE SYSTEM

[75] Inventor: Douglas A. Cromack, Menlo Park, Calif.

[73] Assignee: Talig Corporation, Sunnyvale, Calif.

[21] Appl. No.: 779,495

[22] Filed: Sep. 24, 1985

[51] Int. Cl.⁴ .............................................. G02F 1/13
[52] U.S. Cl. .............................. 350/345; 350/276 SL; 350/339 D; 350/452
[58] Field of Search ............... 350/345, 334, 452, 112, 350/276 SL, 286, 451, 338, 339 R, 339 D, 339 F

[56] References Cited

U.S. PATENT DOCUMENTS

| 3,838,909 | 10/1974 | Fitzgibbons | 350/345 |
|---|---|---|---|
| 3,863,246 | 1/1975 | Trcka et al. | 350/345 |
| 4,264,147 | 4/1981 | Baur et al. | 350/345 |
| 4,298,249 | 11/1981 | Gloor et al. | 350/345 |
| 4,616,903 | 10/1986 | Fergason | 350/334 |

FOREIGN PATENT DOCUMENTS

| 2640231 | 12/1977 | Fed. Rep. of Germany | 350/276 SL |
|---|---|---|---|
| 60-189730 | 3/1984 | Japan | 350/334 |
| 60-241024 | 11/1985 | Japan | 350/334 |

Primary Examiner—John K. Corbin
Assistant Examiner—Martin Lerner
Attorney, Agent, or Firm—Flehr, Hohbach, Test, Albritton & Herbert

[57] ABSTRACT

A display comprising means for selectively scattering or transmitting light in response to a prescribed input and a prismatic lens means located on a non-viewing side of said scattering or transmitting means for focusing light onto a light absorbing surface to enhance the contrast of the display. Alternatively, a prismatic reflector means may be utilized to direct light toward a light absorbing surface.

43 Claims, 8 Drawing Figures

DISPLAY INCLUDING A PRISMATIC LENS SYSTEM OR A PRISMATIC REFLECTIVE SYSTEM

The present invention relates generally to displays, and more particularly to liquid crystal displays including a prismatic lens system or, alternatively, a prismatic reflective system.

Visual display devices may utilize liquid crystals. The property of liquid crystals that enables them to be used in visual displays is the ability of liquid crystals to transmit light in a strictly aligned or field-on state, and to scatter light and/or to absorb it (especially when combined with an appropriate dye) in a relatively free or field-off state. An electric field may be selectively applied across the liquid crystals to switch between field-off and field-on states.

Frequently a visual display device using liquid crystals displays dark characters on a gray or relatively light background. In such devices, it is desirable to improve the effective contrast between the characters displayed and the background, and to reduce or eliminate front surface glare from the display.

There are three categories of liquid crystal materials, namely, cholesteric, nematic and smectic. The present invention relates in a preferred embodiment described hereinafter to the use of nematic liquid crystal which is operationally nematic. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic. A more detailed explanation of operationally nematic liquid crystal material is provided in co-pending U.S. Patent Application Ser. No. 477,242, filed Mar. 21, 1983, in the name of Fergason, entitled Encapsulated liquid crystal and method, assigned to Manchester R&D Partnership, the disclosure of which is hereby incorporated by reference. Reference may also be made to U.S. Pat. No. 4,435,047, issued Mar. 6, 1984, in the name of Fergason, entitled Encapsulated liquid crystal and method, assigned to Manchester R&D Partnership, which disclosure is also hereby incorporated by reference.

The operationally nematic liquid crystal is contained in a containment medium that forms volumes of liquid crystal material. The liquid crystal may be contained in discrete capsules or in a containment medium that tends to form a multitude of capsule-like environments wherein the capsules may be interconnected by channels containing liquid crystal material. In the field-off condition, or any other condition which results in the liquid crystal being in a distorted or randomly aligned state, the liquid crystal structure is distorted to a curved form (hence curvilinearly aligned) wherein the spatial average orientation of the liquid crystal over a capsule-like volume, for instance, is strongly curved and there is no substantial parallel directional orientation of the liquid crystal in the absence of a prescribed input.

Preferably, the operationally nematic liquid crystal has a positive dielectric anisotropy, and has an ordinary index of refraction that substantially matches that of the containment medium. Such material will cause scattering of light incident thereon in the field-off or relatively free state. This liquid crystal material, described in detail in the above-identified U.S. Pat. No. 4,435,047, may be designated encapsulated operationally nematic liquid crystal material or nematic curvilinearly aligned phases ("NCAP") liquid crystal material.

The present invention, however, is not limited in use to NCAP configured liquid crystal. Certain embodiments of the invention may be employed with any of the various types of liquid crystal materials or configurations thereof that selectively scatter and/or absorb or transmit light in response to a prescribed input.

Usually liquid crystal is anisotropic both optically and, for example in the case of nematic liquid crystal, electrically. The optical anisotropy is manifest by the scattering of light when the liquid crystal is in random alignment, and the transmission of light through the liquid crystal when it is in ordered alignment. The electrical anisotropy may be a relationship between the dielectric constant or dielectric coefficient with respect to the alignment of the liquid crystal material.

The present invention relates to improvements in displays as well as to the utilization of the light scattering characteristic of liquid crystal materials in displays. The invention also relates to the use of such materials and characteristics, for example, to obtain relatively dark characters or information displayed on a relatively bright background in both small and large size displays.

An object of the present invention is to provide a display having a relatively high quality of optical brightness and contrast.

Another object of the present invention is to provide a display including a prismatic lens system for enhancing the display of information, the information displayed being vividly contrasted to its background.

A further object of the present invention is to provide a liquid crystal display wherein focused light and scattered light are utilized to create a dark character on a very bright background.

Yet another object of the present invention is to provide a liquid crystal display including a prismatic reflective system wherein the information displayed is sharply contrasted to its background.

As may be seen hereinafter, the display disclosed herein is one which comprises means for selectively scattering or transmitting light in response to a prescribed input and a prismatic lens means located on a non-viewing side of the scattering or transmitting means for enhancing the contrast of the display.

The prismatic lens means may have a part-reflective and part-transparent surface to both focus and reflect incident light. This surface may be 50% reflective and 50% transparent.

Alternatively, for front-lite displays, a prismatic reflector means may be utilized to direct incident light within a prescribed viewing angle onto a light absorbing surface, and to reflect incident light outside of the viewing angle toward an observer at a viewing side of the display. The prismatic reflector means may have a linear or non-linear prismatic geometry.

A liquid crystal means may be utilized for selectively scattering or transmitting light in response to the prescribed input. The liquid crystal means may comprise NCAP liquid crystal. Materials other than liquid crystal, such as electrophoretic materials, which scatter light on one hand and transmit it on the other, however, may also be utilized in the context of the present invention.

The prismatic lens means may include a light absorbing surface visible within a prescribed viewing angle from a viewing side thereof. The prismatic lens means may comprise linear or non-linear optical prisms. The light absorbing surface absorbs substantially all of the light incident thereon. This surface may be located at a face of a prism such that transmitted light within the viewing angle is focused thereon.

The prescribed input is preferably of the electromagnetic type and, more particularly, an electric field. The apparatus may include electrodes for applying the electric field. The electrodes may be located on opposite sides of the liquid crystal means. Substantially optically transparent substrate means may support the electrode means, and a circuit means may be provided to selectively energize the electrode means to apply the electric field.

In accordance with one aspect of the present invention, a liquid crystal display, such as a billboard or sign, can produce relatively dark characters, information, etc. on a relatively bright or white background. The bright background may be produced by liquid crystal material that is randomly aligned in the field-off state wherein light incident on the liquid crystal material is scattered. The dark character is caused, for example, by liquid crystal material that is in a field-on state or in ordered alignment and, thus, substantially optically transparent such that incident light is appropriately focused by the prismatic lens means onto the light absorbing surface. When the liquid crystal material is randomly aligned, only the relatively bright background appears. When a selected portion of the liquid crystal material is orderly aligned, a very dark character will appear against the very bright background to an observer within the viewing cone or viewing angle of the display. The foregoing may be accomplished using relatively low power requirements and minimum liquid crystal material.

The display of the present invention will be described in more detail hereinafter in conjunction with the drawings wherein.

Figure 1:
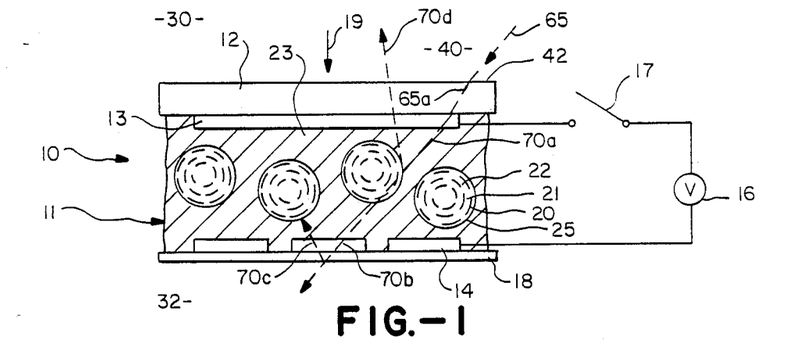
FIGS. 1 and 2 are schematic views that illustrate a liquid crystal apparatus in the field-off and field-on states, respectively, that may be utilized in the present invention.
Figure 2:
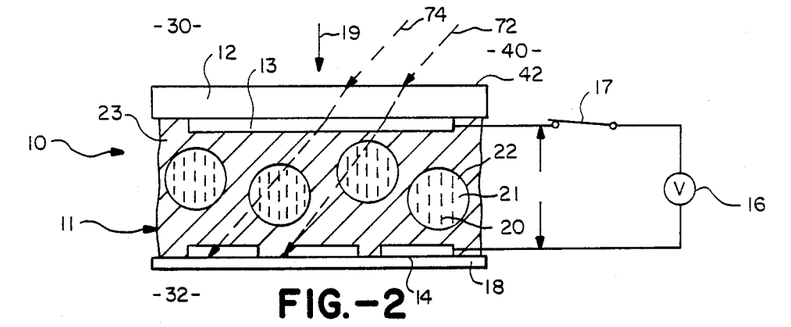

Referring now to the drawings, wherein like reference numerals for like components are utilized throughout the drawings, attention is first directed to FIGS. 1 and 2. FIGS. 1 and 2 show a liquid crystal apparatus indicated generally by reference numeral 10. The apparatus includes a layer or layers of liquid crystal 11 supported on a substrate 18 having an electrode 14 located thereon. The apparatus may furthe include a second electrode 13 mounted on a substrate 12.

The liquid crystal may comprise any liquid crystal material or configuration of liquid crystal material which selectively scatters or transmits light in response to a prescribed input. For example, the liquid crystal may be configured as a twisted nematic apparatus. In a preferred embodiment, the liquid crystal is configured in a curvilinear manner (NCAP). A primary feature of the present invention is that the liquid crystal material will scatter light impinging thereon when in a field-off or random alignment state, and in the field-on or orderly aligned state the liquid crystal material will be substantially optically transparent.

Additionally, materials other than liquid crystal which scatter light on one hand and transmit it on the other in response to a prescribed input may be utilized in the context of the present invention. For instance, an electrophoretic material may be used.

The use of NCAP configured liquid crystal permits substrates 12 and 18 to be flexible. The NCAP configured liquid crystal material disposed between the flexible electrode-coated substrates provides a flexible film that may be conveniently utilized in fabricating the prismatic lens display of the present invention.

A voltage may be applied to electrodes 13 and 14, and hence across liquid crystal 11 from a conventional voltage source 16. Voltage source 16 may be connected to the electrodes by electrical leads through a switch 17. When the switch 17 is closed (See FIG. 2), the electrodes are energized and apparatus 10 is in a field-on state with the molecules of the liquid crystal material in the desired alignment to permit the transmission of light. When the switch is open (See FIG. 1), the electrodes are de-energized and apparatus 10 is in a field-off state such that the liquid crystal scatters light (See FIG. 1).

The NCAP configured light crystal material, which is schematically illustrated in FIGS. 1 and 2, may include a liquid crystal material 20 more or less contained within the confines or the interior volume 21 of a capsule 22 or an encapsulating medium. The NCAP configured liquid crystal material comprises a plurality of such capsules or an encapsulating medium in which liquid crystal material is dispersed.

Each capsule may be discrete or alternatively the liquid crystal material 20 may be contained in a containment medium 23, such as a latex medium as will be hereinafter discussed, that tends to form a multitude of capsule-like environments containing the liquid crystal material. In this regard, the liquid crystal material 20 may be more or less confined to an approximately spherical or otherwise curvilinear surface of a containment cavity. Such cavities, however, may be interconnected, for example, by one or more channels or passages. The liquid crystal material would preferably be in both the discrete volumes or cavities and in the interconnecting passages. Thus, the internal volumes of respective capsules may be fluidly coupled via one or more interconnecting passages. All of the aspects and features of the present invention vis-a-vis individual unconnected capsules have been found to be applicable to an arrangement of capsules that have one or more interconnecting passages.

Preferably, liquid crystal material 20 is nematic liquid crystal material having positive dielectric anisotropy.

Nematic liquid crystal material has fluid-like properties that facilitate the conformance or the distortion thereof to the shape of the capsule wall in the absence of an electric field. On the other hand, in the presence of an electric field such nematic material will relatively easily change to ordered alignment with respect to such field.

As shown in FIG. 1, in the field-off state, the molecules of liquid crystal, depicted as dashed lines, conform to the shape of the cavity containing the liquid crystal. The directional orientation of a layer of liquid crystal molecules may be distorted to curve in the direction that is parallel to an approximate area of the wall surface 25 of a cavity. More generally, all that is required is that the interaction between the cavity wall 25 and the liquid crystal material 20 produces an orientation in the liquid crystal near that wall that is generally uniform and piece-wise continuous, so that the spatial average orientation of the liquid crystal material over the capsule volume is strongly curved and there is no substantial parallel direction of orientation of the liquid crystal structure. It is this strongly curved orientation that results in the scattering and polarization insensitivity (the liquid crystal material is insensitive to the direction of optical polarization of incident light) in the field-off condition.

In the field-on condition (See FIG. 2), or any other condition which results in the liquid crystal being in ordered or parallel alignment, the liquid crystal material 20 will transmit substantially all the light incident thereon and will tend not to be visible. The light that is transmitted is that which is focused by the prismatic lens system or reflected by the prismatic reflective system to optically enhance a display of information. On the other hand, as noted, in the field-off condition when the liquid crystal is in distorted or random alignment, some of the incident light will be absorbed, but most of the incident light will be scattered.

The index of refraction of containment medium 23 and the ordinary index of refraction (the index when an electric field is applied) of the liquid crystal material 20 should be matched as much as possible when in the field-on state to avoid scattering. However, when the liquid crystal material is in the field-off state, there will be a difference in the indices of refraction at the boundary of the liquid crystal material 20 and the wall of capsule 22, for example. Specifically, the extraordinary index of refraction (the index with no electric field) of the liquid crystal is greater than the index of refraction of medium 23. This causes refraction at that interface or boundary and, thus, scattering.

As long as the ordinary index of refraction of the liquid crystal material is closer to the index of refraction of the containment medium, than is the extraordinary index of refraction, a change in scattering will result when going from field-on to field-off states, and vice-versa. For any given index of refraction, maximum contrast results when the ordinary index of refraction of the liquid crystal matches the index of refraction of the medium. The closeness of the index matching will be dependent on the desired degree of contrast and transparency in the device, but the ordinary index of refraction of the liquid crystal and the index of the containment medium will preferably differ by no more than 0.03, more preferably, 0.01, especially 0.001.

Preferably, the electric field E (See FIG. 2) is applied to the liquid crystal material 20 for the most part rather than being dissipated or dropped substantially in the containment medium. There should not be a substantial voltage drop across or through the material of which the containment medium is formed. Rather, the voltage drop should occur across the liquid crystal material 20 within the volume 21 of the capsule 22.

Additionally, the electrical impedance of the containment medium preferably should in effect be large enough relative to that of the liquid crystal such that a short circuit will not occur exclusively through the medium to bypass the liquid crystal.

The dielectric constant of the material of which the containment medium is formed and the dielectric coefficient of the liquid crystal, and the effective capacitance values of the containment medium, particularly in a radial direction, and of the liquid crystal material across which the electric field E is imposed, all should be so related that the containment medium does not substantially drop the magnitude of the applied electric field E. Ideally the capacitance dielectric constants (coefficients) of the entire layer of NCAP liquid crystal should be substantially the same for the field-on condition.

The liquid crystal material 20 will have a dielectric coefficient value that is anisotropic. It is preferable that the dielectric constant of the containment medium be greater than the dielectric coefficient of the liquid crystal material 20. The differential between the dielectric coefficient for the liquid crystal material 20 when no electric field is applied, which should be rather small, and the dielectric coefficient for the liquid crystal material when it is aligned upon the application of the electric field, which should be relatively large, should be as large as possible. The critical relationship of dielectric values and applied electric field should be such that the field applied across the liquid crystal material in the containment medium is adequate to cause alignment of the liquid crystal with respect to the field. The relationship between the dielectric constant of the containment medium and the dielectric coefficient of the liquid crystal 20 may be achieved when the liquid crystal has a positive dielectric anisotropy.

In accordance with the present invention, substrates 12 and 18, and electrodes 13 and 14 are optically transmissive so that liquid crystal apparatus 10 can control the transmission of light therethrough in response to the application of an electric field. Electrode 13 may, for example, form a single common electrode surface while electrode 14 comprises a patterned electrode having multiple electrode portions that can be selectively energized to apply the electric field to selected portions of the liquid crystal material. For instance, as is well known in the art, electrode 14 may be divided into seven electrically isolated segments, each of which may be selectively energized to display various numerical characters. Electrode 14 could also be configured to form a dot matrix display comprising a plurality of dots or pixels arranged in column and rows. A row is enabled to accept display information in parallel via the column lines.

Preferably, a plurality of NCAP liquid crystals are applied to substrate 18 in a manner such that the NCAP liquid crystals adhere to electrode 14 and substrate 18. The material of which capsule 22 is formed is suitable for binding or otherwise adhering the capsule to the electrode and/or substrate. In one embodiment, capsule 22 is formed of a polyvinyl alcohol (PVA). In a preferred embodiment, the liquid crystal material is dispersed or entrapped in a latex containment medium. In either embodiment, substrate 18 may be a polyester film, such as Mylar®, that has been precoated with a layer of indium tin oxide (ITO) to form electrode 14. Preferably, the film has been precoated with a 90 to 500 ohms per square layer of ITO, and most preferably with a 450±150 ohms per square layer of ITO. Of course, materials other than ITO may be used to form the electrodes of the apparatus of the present invention. A Mylar ® film with a precoated ITO electrode, known as Intrex, may be purchased from Sierracin of Sylmar, Calif. Such an electrode-coated film is very flexible.

As noted, latex entrapped NCAP liquid crystal is used in a preferred embodiment. Latex entrapped NCAP liquid crystal comprises the entrapment of liquid crystal in a latex medium. The latex is a suspension of particles. The particles may be natural rubber or synthetic polymers or copolymers. A latex medium is formed by drying a suspension of such particles. A further explanation of latex entrapped NCAP liquid crystal and methods of making the same are provided in U.S. Patent Application Ser. No. 705,209, filed Feb. 25, 1985, in the name of Pearlman, entitled Latex entrapped NCAP liquid crystal composition, method and apparatus, assigned to the assignee of the present invention, and which disclosure is hereby incorporated by reference.

Briefly, latex entrapped NCAP liquid crystal may be formed by mixing a suspension of latex particles and liquid crystal material wherein the liquid crystal material has been previously emulsified in an aqueous phase. Alternatively, all components may be combined prior to emulsifying the liquid crystal material. The mixture may then be applied to substrate 18 and electrode 14. As the mixture dries, it adheres to the electrode-coated side of the polyester film. When dried, the latex particles form a latex medium with particles of liquid crystal dispersed therein.

A specific method for making latex entrapped NCAP liquid crystal may comprise first emulsifying 36 grams of the liquid crystal ROTN701 (manufactured by Hoffman La Roche of New York, N.Y.) in a solution containing 14 grams of a 12% aqueous solution of PVA and 1 gram of the surfactant TWEEN 20 (available through ICI Americas Incorporated of Wilmington, Del.). The liquid crystal is added continuously while the solution is mixed with an impeller blade at 3500 RPM. When the particle size of the liquid crystal is about 1-5 microns, 49 grams of Neorez R-967 (manufactured by Polyvinyl Chemical Industries, Wilmington, Mass.), containing 40% latex particles by weight, is added with slow mixing of less than 1000 RPM until the mixture is homogenous. This material may then be cast with a doctor blade or other suitable means onto substrate 18 and electrode 14.

After the NCAP liquid crystal material has dried onto electrode 14 and substrate 18, substrate 12 and electrode 13 may be laminated onto the surface of the latex entrapped NCAP liquid crystal material. Substrate 12 may also be a flexible, Mylar ® film precoated with a 90 to 5000 ohms per square, most preferably a 450±150 ohms per square, layer of ITO to form electrode 13.

In accordance with an aspect of the present invention, light, for example that is represented by a light beam 19 (See FIGS. 1 and 2), incident on the liquid crystal material will be scattered to yield a white or bright appearance from a viewing side 30 of the liquid crystal apparatus when the liquid crystal is in a field-off or random alignment state, and a dark appearance when the liquid crystal material, or a selected portion thereof, is in a field-on or ordered alignment state. The present invention enhances the effective contrast between the characters or information displayed and the background.

It is noted that light incident on apparatus 10 will be refracted, due to a mismatch in indices of refraction, as it passes through the different materials that comprise apparatus 10. Apparatus 10 may be used, for example, in an air environment, represented by the reference numeral 40. The air forms an interface 42 with the substrate 12 at the front side or from the viewing direction 30.

As shown in FIG. 1, the liquid crystal material 20 is in a random alignment when in the field-off state. Incident light beam 65 enters substrate 12 at the interface 42 and is refracted (see light beam 65a) ultimately impinging as incident light beam 70a on the layer of liquid crystal. The random or distorted liquid crystal material will scatter the light incident thereon. There are several possibilities of how such incident light beam 70a would tend to be scattered.

For example, one possibility is that the incident light beam 70a will be directed according to the dotted line 70b through the layer of liquid crystal material toward the non-viewing side 32 of the liquid crystal apparatus. Light beam 70b may impinge on a reflective surface at the non-viewing side to be reflected as light beam 70c back to the layer of liquid crystal material where it will be treated as another independently incident light beam thereto, just like the light beam 70a from which it was derived. Therefore, such light beam 70c will undergo scattering, further enhancing the brightness of the background of the display.

Another possibility is that the light beam 70a, or that derived therefrom, such as the light beam 70c, will be scattered toward the interface 42 at an angle that is so close to normal at that interface that the light beam will pass through the interface 42 into the medium 40 to be viewed by an observer or observing instrument. Light beam 70d represents such a light beam emitted from the apparatus 10. It is that light, for example, the sum of such emitted light beams 70d, which exits at the interface 42 that causes the liquid crystals to give the appearance of a white or bright background when viewed from the viewing side 30.

Referring to FIG. 2, the field-on or ordered alignment state and operation of the liquid crystal apparatus are shown. Particularly, an electric field E has been applied between electrode 13 and electrode 14. For instance, if electrode 14 is configured to form a figure eight pattern, selected conductive segments may be energized to display the desired numeral. The light beams 72 and 74, for instance, would be transmitted through the aligned and, thus, effectively transparent or non-scattering liquid crystal material located between the energized electrodes.

As discussed below, light beams 72 and 74 will be focused by the prismatic lens system onto or directed by the prismatic reflective system towards a light absorbing surface. The sum of such focused or reflected light beams display the selected numeral, character or other information to an observer at the viewing side 30. Particularly, to an observer at viewing side 30, the area between the energized electrodes may appear very dark wherein the light beams are focused or reflected onto a light absorbing surface, comprising a black absorber for absorbing at least substantially all of the light incident thereon.

The liquid crystal material that is not located between the energized electrodes is still in the field-off state. Thus, that material still scatters light incident thereon from both the viewing and non-viewing sides. Therefore, the numerals or other information displayed appear as very dark characters against a very brilliant or white background.

Figure 3:
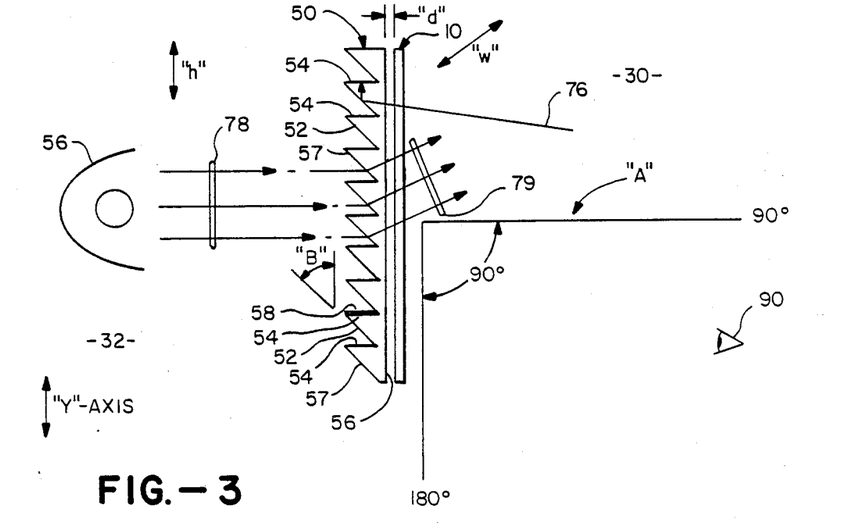
FIG. 3 is a schematic, side elevational view illustrating one embodiment of the display of the present invention utilizing a right-angle optical prism and a back lighting source.

One embodiment of the present invention is illustrated in FIG. 3. This embodiment includes a liquid crystal apparatus 10 as part of a display assembly comprising a prismatic lens system indicated generally by reference to numeral 50. The prismatic lens system forms a back plane of the display. Light incident on apparatus 10 from the front or viewing side 30 thereof is either scattered or transmitted therethrough. Whether such incident light is focused or defocused (scattered) depends on whether an electric field or other input is applied to the liquid crystal or some portion thereof.

Prismatic lens system 50 may include a series or plurality of substantially right-angle optical prisms 52 positioned adjacent to but spaced from liquid crystal apparatus 10. The spacing "d" between the lens system 50 and the liquid crystal apparatus is preferably about one inch. However, the spacing may be as great as five inches or as close as to actually touch. In this latter respect, lens system 50 may be secured directly to apparatus 10 by an adhesive. The height "h" and "w" of lens system 50 corresponds to the display area of liquid crystal apparatus 10. Thus, light incident on apparatus 10 from viewing side 30 is appropriately focused by the prismatic lens system to create the enhanced display.

Each optical prism 52 preferably includes a light absorbing surface 54 for absorbing light focused thereon by means of the prisms 52. Incident light within the prescribed viewing angle "A" transmitted by that portion of the liquid crystal apparatus 10 in the field-on state is focused onto surface 54 (see ray trace 76). Surface 54 may be a black absorbing surface for absorbing substantially all incident light from inside the prism, or, alternatively, a colored surface for absorbing only one or more specified wavelengths of light.

The display illustrated in FIG. 3 is a backlight display that includes a backlighting source 56 located on a non-viewing side 32 thereof. Source 56 may comprise a collimated, fluorescent light source that is arranged such that light rays 78 emanating therefrom are substantially parallel to absorbing surface 54. Light emanating from source 56 is directed through lens system 50 and the liquid crystal apparatus 10 (see light beam 79), where it may be transmitted or scattered by the liquid crystal, toward viewing side 30 depending on whether the liquid crystal is in the field-on or field-off state. In FIG. 3, light beam 79 represents light from source 56 that is transmitted by the liquid crystal without being scattered. The lens system 50 thus permits light to pass from the non-viewing to the viewing side of the display where it is visible to an observer 90 within viewing cone "A".

The backlighting scheme is utilized to overcome front surface glare, and to enhance the appearance of the display especially when operated other than in bright sunlight. The light source may provide colored or white light.

The dimension of absorbing surface 54 in the "x" direction is substantially equal to the dimension of the liquid crystal apparatus in that direction. As a result, the viewing angle of the display in the "x" direction or plane is approximately 180° C. Therefore, if the display is located in a room, an observer 90 at the front or viewing side 30 of the display would be able to see the information displayed from a wide angle within the room.

The angle of view "A" of the display in the "y" direction or plane is preferably about 90°. This is an exceptionally wide viewing angle that permits an observer or observing instrument 90 to observe the display even if located directly below it.

The face 57 of prism 52 forming the hypotenuse thereof forms an angle "B" with the liquid crystal apparatus 10. The prism angle "B" effects the amount of light transmitted through the display from source 56. The prism angle "B" also effects the size of viewing angle "A". The angle "B" is inversely proportional to the amount of light transmitted through the display from source 56, and directly proportional to the size of the viewing angle. Thus, light transmission increases when the prism angle "B" decreases. A smaller angle "B", however, also means that the viewing angle "A" is smaller.

The index of refraction of the prism material also effects the light transmission. The transmission drops as the index of refraction increases. Optical prisms utilized in the present invention may be made of such materials as acrylics, polycarbonates or polystyrenes.

For a lens system positioned parallel to a liquid crystal apparatus 10, as shown in FIG. 3, wherein the prisms are made of acrylics, the preferred dimension for prism angle "B" is between about 42.15° and 45°. A more preferred range for the prism angle is between about 44° and 45°. This range of angles provides a viewing angle of about 90°. The most preferred prism angle for an acrylic material is about 44°.

For prisms made of polycarbonates or polystyrenes, the preferred range of prism angles is between about 38.7° and 41°. The most preferred prism angle is believed to be about 41°.

The ray traces of FIG. 3 illustrate that light from backlight source 56 (represented by light beams 78, 79) pass through lens system 50 and liquid crystal apparatus 10 to be visible to an observer 90 on viewing side 30. Light from source 56 impinging on liquid crystal material in the de-energized state will be scattered to increase the brightness of the display background. On the other hand, light within viewing cone "A" from viewing side 30 (represented by light beam 76) is focused by lens system 50 onto absorbing surfaces 54. Therefore, if surfaces 54 comprise black absorbers, the information displayed by the energized portion of the liquid crystal apparatus 10 will appear as a very dark character, numeral, etc. against a very white or brilliant background to an observer 90 within the viewing cone. The appearance of the display is further enhanced by the fact that some of the light impinging upon the optical prisms 52 from viewing side 30 will be reflected back to the liquid crystal apparatus to undergo scattering, thereby further increasing the brightness of the display.

To increase the amount of light transmitted through the display from light source 56, a light reflective coating 58 may be applied to absorbing surface 54 on the non-viewing side 32 thereof. Coating 58 may comprise a white paint that reflects additional light through the liquid crystal apparatus 10 from light source 56.

Figure 4:
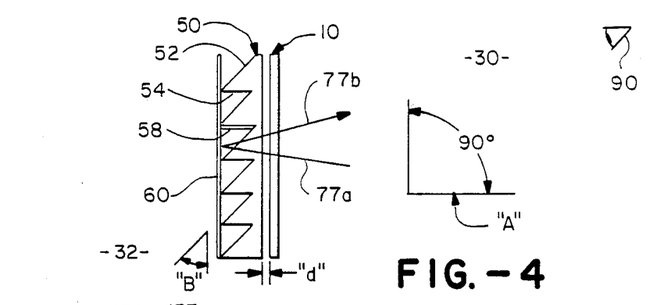
FIG. 4 is a schematic representation of a display similar to FIG. 3 but configured to be observed from above.

The display of FIG. 3 is configured so that it is best observed from a location below the display. An example of such a display is a roadside billboard. If the display is to be observed from a location above, the lens system is in effect turned upside down. Thus, as shown in FIG. 4, light within viewing angle "A" is focused on absorbing surfaces 54 such that surfaces 54 are visible to an observer 90 located above the display. An example of a display designed to be observed from above is an automobile dashboard display.

The backlighting source 56 may be replaced by a reflective surface 60 as also illustrated in FIG. 4. The reflective surface is located on the non-viewing side of the display such that light passing through liquid crystal apparatus 10 is reflected back through apparatus 10 (see light beams 77 and 76) to undergo scattering thereby increasing the brightness of the display. Reflective surface 60 comprises a mirrored surface formed from reflective materials such as aluminum or silver.

Figure 5:
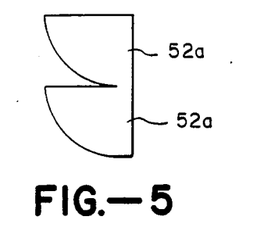
FIGS. 5 and 6 are schematic views illustrating other configurations of optical prisms that may be utilized in the context of the present invention.
Figure 6:
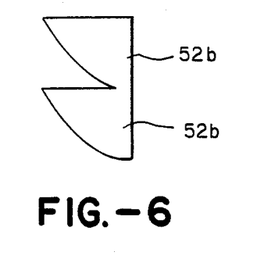

The prismatic lens system preferably comprises a series of substantially right-angle optical prisms. However, other prismatic configurations may be utilized in the context of the present invention. An optical prism configuration suitable for use in a front-light display is the pyramid-shaped optical prism system illustrated in FIG. 8, discussed in more detail below. The pyramid-shaped and right-angle optical prisms are linear optical prisms. The prismatic lens system may also comprise non-linear optical prisms such as half-round optical prisms 52a (See FIG. 5) or parabolic optical prisms 52b (See FIG. 6).

For backlighting schemes, the pyramid-shaped optical prisms do not perform as well as the substantially right-angle optical prisms. This is because the exit angle of the pyramid-shaped prism is larger than the right-angle prism, and because the pyramid-shaped prism has low transmission at the straight incident angle.

The lens system 50 of FIG. 3 may be fabricated by pressing a clear acrylic sheet into the desired prismatic configuration. Other optically transmissive materials such as polyester, polystyrene, glass, and polycarbonates may be utilized. The lens system may also be formed by various molding or extrusion processes.

Figure 7:
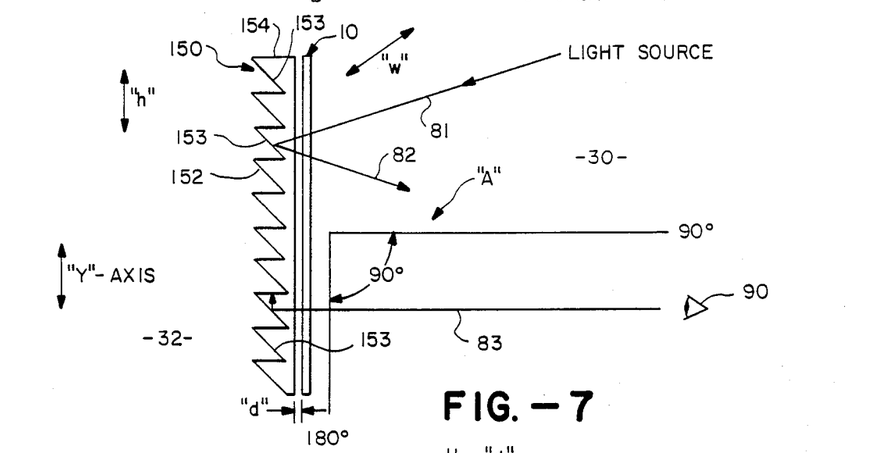
FIG. 7 is a schematic, side elevational view illustrating the embodiment of FIG. 3 utilizing a front lighting source.

The display shown in FIG. 7 is a front-light display having a prismatic reflector system 150 comprising a plurality of right-angle reflectors 152. A target or light absorbing surface 154 is included as part of the reflector system. The display of FIG. 7 differs from the display of FIG. 3 in that the optical prisms 52 are replaced by reflectors having a prismatic geometry. The reflective system is formed from a light reflective material rather than an optically transmissive material. Light reflective surfaces 153 of reflectors 152 reflect light (represented by light beams 81, 82) from outside the viewing cone "A" back towards observer 90. The light reflected back towards the viewing side 30 undergoes scattering when it impinges upon the liquid crystal material in the field-off state. This creates a very bright background for the display of information. The reflective surfaces 153 also directs light (represented by light beam 83) within the prescribed viewing cone "A" onto the target surface 154.

The source of front lighting may be natural sunlight or an artificial source of light. Outdoor billboards and automobile dashboard displays may be front-lite.

Reflectors 150 of reflective system 150 may be fabricated by pressing or folding a light reflective metal, such as aluminum or silver film, into the desired prismatic configuration, for example, a right-angle or pyramid-shaped reflector. This system is attractive for front-lite schemes as it is less costly to manufacture than an optically transmissive, prism system, and it provides the same optical effect.

The prismatic geometry of the reflector system may be other than a right-angle geometry. For example, reflectors 152 may have a pyramid geometry. The reflectors may also have a non-linear prismatic geometry.

Figure 8:
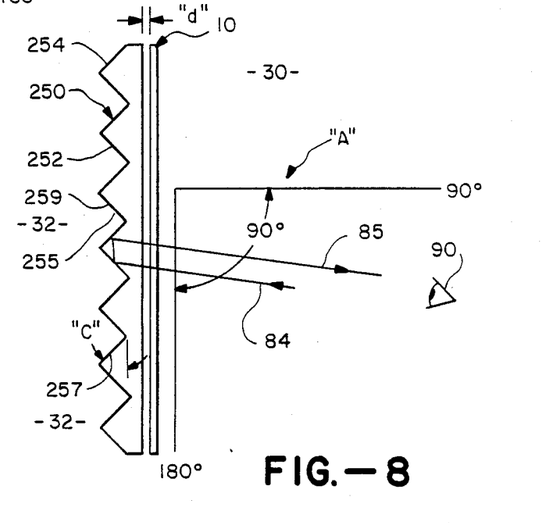
FIG. 8 is a schematic, side elevational view illustrating a further embodiment of the display of the present invention utilizing a pyramid-shaped optical prism.

FIG. 8 illustrates a display having a lens system 250 utilizing pyramid-shaped optical prisms 252 having light absorbing surfaces 254. Other geometries, both linear and non-linear, may be utilized.

In the embodiment illustrated, a part-reflective, part-transmissive coating 259 is applied to surface 255. The ratio of reflective to transmissive surface may vary. For example, the surface may be 50% reflective and 50% transmissive.

The display may be front-lite when ambient light, daylight, is present, while at the same time allowing the use of a light source from behind, such as fluorescent light tubes. The backlighting source provides auxiliary light, and full lighting when no ambient light is present, for example, at night. An example of a coating 259 that may be utilized in this embodiment is a sputtered aluminum coating that is 50% transparent and 50% reflective.

Light (represented by light beams 84, 85) within viewing angle "A" is focused by prisms 252 onto the target or light absorbing surface 254. As noted, surface 259 is also light reflecting; thus, incident light, outside of viewing angle "A", is reflected back toward to liquid crystal apparatus 10 where it is scattered by the liquid crystal in the field-off state.

The prism angle "C", which is the angle from the vertical of prismatic face 257 having absorbing surface 254, corresponds in dimension and range to prism angle "A," discussed heretofore. These angles provide a viewing cone of about 90°.

The above described assemblies may form one of a plurality of modules which may be stacked in rows and columns to form a larger display.

The display configurations of the present invention are adaptable to such displays as outdoor billboards, indoor display signs, automobile dashboard displays, window mounted displays, gas price signs, time and temperature highway signs, and scoreboards both portable and fixed. The display configurations may also be utilized in many varieties of light control in architectural lighting applications.

The present invention may also be used in alternate embodiment wherein bright characters are displayed on a relatively dark background. In such an embodiment, the liquid crystal material located in the display segments used to form the character or information displayed would be in a field-off state such that light is scattered to create characters having a bright appearance. The liquid crystal material in the display segments surrounding the character segments would be in a field-on state such that light is appropriately focused onto suitable target surfaces to create a relatively dark background.

Although certain specific embodiments of the invention have been described herein in detail, the invention is not to be limited only to such embodiments, but rather only by the appended claims.

What is claimed is:

1. A display comprising means for selectively scattering or transmitting light in response to a prescribed input and a prismatic lens means located in back and on a non-viewing side of said scattering or transmitting means, said prismatic lens means having a light absorptive surface extending along a face thereof such that light transmitted through said scattering or transmitting means from a viewing side thereof is focused onto said light absorptive surface to enhance the contrast of the display.

2. The display of claim 1 wherein a light reflecting surface is formed on the top of said light absorptive surface to increase the light passing through said prismatic lens means from said non-viewing side.

3. The display of claim 1 wherein a second face of said prismatic lens means is partly transmissive and partly reflective to focus light on said light absorptive surface and to reflect light toward said viewing side.

4. The display of claim 1 wherein said prismatic lens means comprises a series of linear optical prisms.

5. The display of claim 1 wherein said prismatic lens means comprises a series of non-linear optical prisms.

6. The display of claims 1, 2, or 3 wherein said scattering or transmitting means comprises a liquid crystal means.

7. The display of claim 6 wherein said liquid crystal means comprises at least one layer of nematic curvilinearly aligned phases liquid crystal material.

8. A display comprising means for selectively scattering or transmitting light in response to a prescribed input, a light refracting means located in back and on a non-viewing side of said scattering or transmitting means, said light refracting means having front and rear surfaces wherein said front surface is proximate to said scattering or transmitting means, and a light absorptive means substantially disposed along a path between the front surface and the rear surface of said light refracting means such that light transmitted through said scattering or transmitting means from a viewing side thereof is focused onto said light absorptive means for enhancing the contrast of the display.

9. The display of claim 8 wherein said scattering or transmitting means comprises a liquid crystal means.

10. The display of claim 9 wherein said light refracting means is partly reflective and partly transmissive.

11. The display of claim 9 or 10 wherein said light refracting means comprises a plurality of linear prisms.

12. The display of claim 11 wherein the prism angle of said linear prisms is between about 38.7° and 45°.

13. The display of claim 12 wherein said prism angle is between approximately 44° and 45°.

14. The display of claim 8 wherein said light absorptive means is a light absorbing surface comprising a black absorber for absorbing substantially all of the light incident thereon.

15. The display of claim 8 wherein said light absorptive means is a light absorbing surface comprising a colored absorber for absorbing only one or more specified wavelengths of light.

16. The display of claim 9 further including a source of backlighting located at said non-viewing side and a light reflective coating located on said light absorptive means to permit the transmission of more light through the display from said non-viewing side.

17. A display comprising means selectively operable for affecting light incident thereon by selectively scattering or transmitting light in response to a prescribed input, and optical prisms positioned behind and on a non-viewing side of said selectively operable means adjacent thereto for focusing light transmitted through said selectively operable means from a viewing side of said selectively operable means and within a predetermined viewing angle onto a light absorbing surface extending substantially along a face of said optical prisms.

18. The display of claim 17 wherein said selectively operable means comprises a liquid crystal means.

19. The display of claim 18 wherein said liquid crystal means comprises at least one layer of nematic curvilinearly aligned phases liquid crystal material.

20. The display of claim 19 wherein said optical prisms comprises a series of linear optical prisms having a prism angle of between approximately 38.7° and 45°.

21. The display of claim 20 further including an illumination source on said non-viewing side for directing light toward said optical prisms.

22. The display of claim 21 further including a light reflective coating on said light absorbing surface to permit the transmission of more light through the display from said illumination source.

23. The display of claim 19 wherein said optical prisms comprise a series of non-linear optical prisms.

24. The display of claim 17 wherein said light absorbing surface comprises a black surface for absorbing at least substantially all of the light incident thereon.

25. The display of claim 19 wherein a second face of said optical prisms is partly transmissive and partly reflective to focus light within said viewing angle on said light absorbing surface and to reflect light outside of said viewing angle toward a viewing side of the display.

26. A display comprising means for selectively scattering or transmitting light in response to a prescribed input, and a prismatic lens means positioned on a non-viewing side of the display having a part-reflective and part-transparent surface for focusing light transmitted through said selectively scattering or transmitting means from a viewing side of the display within a viewing angle onto a light absorbing surface at a face of said prismatic lens means and for reflecting light outside of said viewing angle toward said viewing side.

27. The display of claim 26 further including a source of backlighting located on said non-viewing side for directing light toward said prismatic lens means.

28. The display of claim 27 wherein said selectively scattering or transmitting means comprises a liquid crystal means.

29. A display comprising means for selectively scattering or transmitting light in response to a prescribed input, and a prismatic reflector means located on a non-viewing side of said scattering or transmitting means for directing light transmitted through said scattering or transmitting means from a viewing side of the display within a viewing angle onto a light absorbing surface extending along a face of said prismatic reflector means and for reflecting light outside of said viewing angle toward said viewing side to enhance the contrast thereof.

30. The display of claim 29 wherein said scattering or transmitting means comprises a liquid crystal means.

31. The display of claim 30 wherein said liquid crystal means comprises at least one layer of nematic curvilinearly aligned phases liquid crystal material.

32. The display of claim 29 or 30 wherein said prismatic reflector means has a right-angle prismatic configuration.

33. The display of claim 29 or 30 wherein said prismatic reflector means has a pyramid-shaped configuration.

34. The display of claim 29 wherein said light absorbing surface is a black absorber for absorbing substantially all of the light incident thereon.

35. The display of claim 29 wherein said light absorbing surface is a colored absorber for absorbing only one or more specified wavelengths of light.

36. A method for contrast enhancement comprising providing a light refracting means having a light absorbing surface at a face thereof for presenting an absence of light over a viewing angle and providing an electro-optical device which scatters light or transmits light according to a prescribed input wherein said light refracting means is located at a non-viewing side of said electro-optical device.

37. A method for contrast enhancement for a display comprising selectively scattering or transmitting light in response to a prescribed input, focusing by a prismatic lens means light so transmitted from a viewing side of the display and within a prescribed viewing angle onto a light absorbing surface of said prismatic lens means to effect a display of information, and reflecting the transmitted light outside of said viewing angle toward said viewing side.

38. The method of claim 37 further including illuminating the display from a non-viewing side thereof.

39. A method of contrast enhancement for a display comprising selectively scattering or transmitting light in response to a prescribed input, directing by a prismatic reflector light transmitted from a viewing side of the display within a predetermined viewing angle to a light absorbing surface located on a surface of said prismatic reflector, and reflecting transmitted light outside of said viewing angle toward said viewing side.

40. A display comprising means switchable between a first state in which incident light is at least one of scattered and absorbed and a second state in which the amount of such scattering or absorption is reduced, a light refracting means located in back of and on a non-viewing side of said switchable means, said light refracting means having front and rear surfaces where said front surface is proximate to said switchable means, and a light absorptive means substantially disposed along a path between said front and rear surfaces such that light transmitted through said switchable means from a viewing side thereof is focused onto said light absorptive means.

41. The display of claim 40 further including a light reflective means formed on top of said light absorptive means to increase the light passing through said light refracting means from said non-viewing side.

42. The display of claim 8 or 40 further including a source of backlighting located at said non-viewing side wherein said light refracting means is transparent such that light from said backlighting source may be transmitted through said light refracting means.

43. The display of claim 1 further including a source of backlighting located at said non-viewing side wherein said prismatic lens means is transparent such that light from said backlighting source may be transmitted through said prismatic lens means.

* * * * *